United States Patent [19]

Bornhorst

[11] Patent Number: 5,031,078

[45] Date of Patent: Jul. 9, 1991

[54] ADDITIVE COLOR MIXING SYSTEM WITH VARIABLE HUE AND SATURATION LIGHT SOURCES

[75] Inventor: James M. Bornhorst, DeSoto, Tex.

[73] Assignee: Vari-Lite, Inc., Dallas, Tex.

[21] Appl. No.: 399,827

[22] Filed: Aug. 28, 1989

[51] Int. Cl.$^5$ ............................................. F21V 7/04
[52] U.S. Cl. ..................................... 362/32; 362/237; 362/268; 362/293; 362/302
[58] Field of Search ............... 362/321, 230, 231, 237, 362/241, 268, 293, 298, 300, 301, 302, 304

[56] References Cited

U.S. PATENT DOCUMENTS

| | | |
|---|---|---|
| 1,219,514 | 3/1917 | Whitney . |
| 2,627,207 | 2/1953 | Bell . |
| 3,011,388 | 12/1961 | Baumbach et al. . |
| 3,043,179 | 7/1962 | Dunn . |
| 3,085,468 | 4/1963 | Hehn . |
| 3,120,782 | 3/1964 | Goddard et al. . |
| 3,359,424 | 12/1967 | Dreyfoos ............................ 250/208 |
| 3,492,070 | 1/1970 | Zahn . |
| 3,536,908 | 10/1970 | Oster . |
| 3,564,332 | 2/1971 | Blakeslee ............................ 315/154 |
| 3,805,065 | 4/1974 | Williams . |
| 3,818,216 | 6/1974 | Larraburu . |
| 3,825,335 | 7/1974 | Reynolds ............................... 355/1 |
| 3,825,336 | 7/1974 | Reynolds ............................... 355/1 |
| 3,924,121 | 12/1975 | Barbieri .............................. 250/226 |
| 3,945,731 | 3/1976 | Graser, Jr. . |
| 4,037,097 | 7/1977 | Stillman et al. .................. 350/318 X |
| 4,043,646 | 8/1977 | Heine et al. ......................... 350/315 |
| 4,048,493 | 9/1977 | Lee .................................... 250/205 |
| 4,099,864 | 7/1978 | Gilligan et al. ........................ 355/37 |
| 4,142,801 | 3/1979 | Calder et al. ......................... 356/251 |
| 4,188,111 | 2/1980 | Marvin ................................. 355/37 |
| 4,298,920 | 11/1981 | Gluck et al. ......................... 362/281 |
| 4,314,318 | 2/1982 | Dana .................................. 362/240 |
| 4,392,187 | 7/1983 | Bornhorst ........................... 362/233 |
| 4,454,570 | 6/1984 | Morello .............................. 362/231 |
| 4,488,207 | 12/1984 | Harmon .............................. 362/231 |
| 4,535,394 | 8/1985 | Dugre ................................ 362/231 |
| 4,600,976 | 7/1986 | Callahan ............................ 362/277 |
| 4,602,321 | 7/1986 | Bornhorst ........................... 362/268 |

FOREIGN PATENT DOCUMENTS

932880 9/1955 Fed. Rep. of Germany .

OTHER PUBLICATIONS

"The Perfect Club Mixer . . . Crystal Color", Artifex Corporation, Brochure, 11/1988.

*Primary Examiner*—Stephen F. Husar
*Attorney, Agent, or Firm*—Morgan & Finnegan

[57] ABSTRACT

A high performance color mixing system combines colored light beams from three primary color sources into a composite light beam. Each light source assembly can be individually dimmed to control the color of the composite beam. Each primary color beam can be varied in hue and saturation by the use of pivoting dichroic filters, thereby providing improved performance and increased capability. This system is capable of producing deeply saturated colors in all hues, and does not comprise performance in white, provides good color balance and sufficient intensity when the dichroic filters are pivoted to a position parallel to the light rays of the beam.

26 Claims, 7 Drawing Sheets

FIG. 3
100% INTENSITY
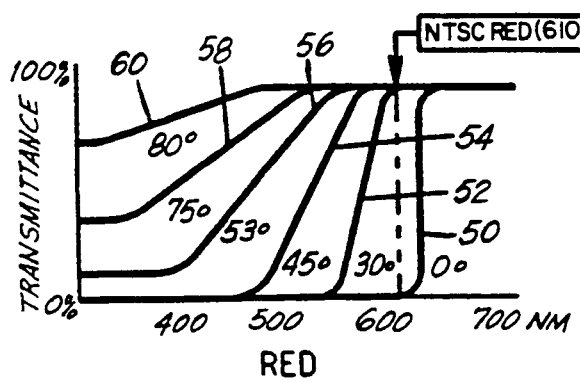
FIG. 3A
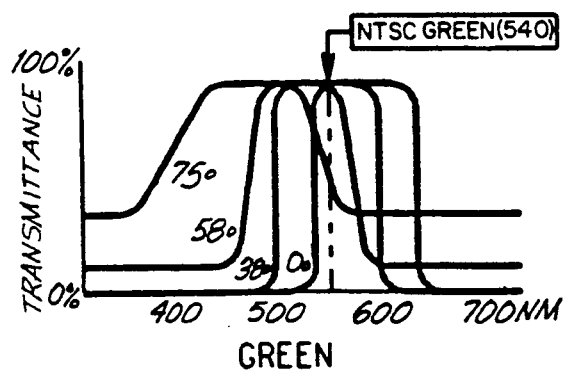
FIG. 3B
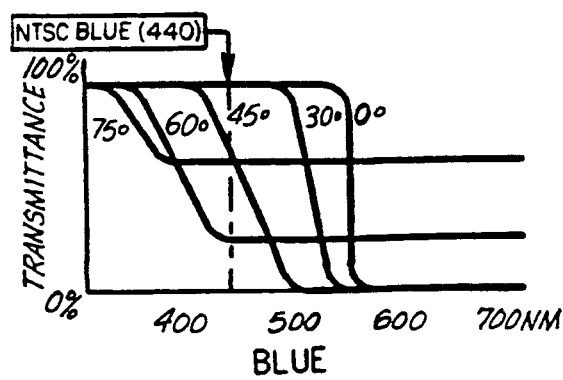
FIG. 3C
50% INTENSITY
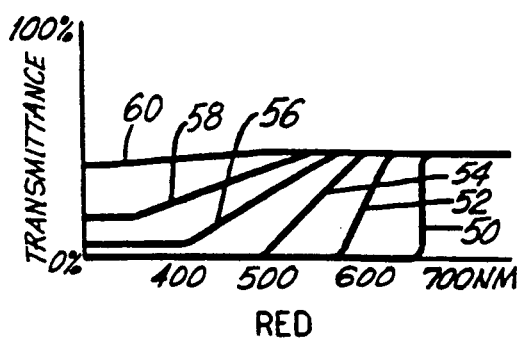
FIG. 3D
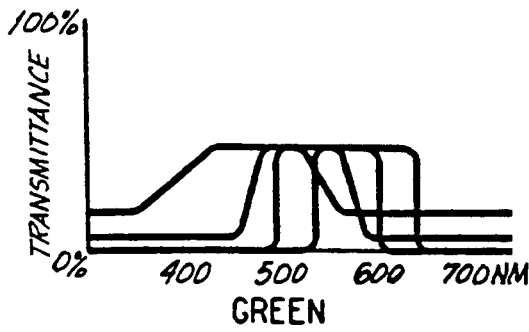
FIG. 3E
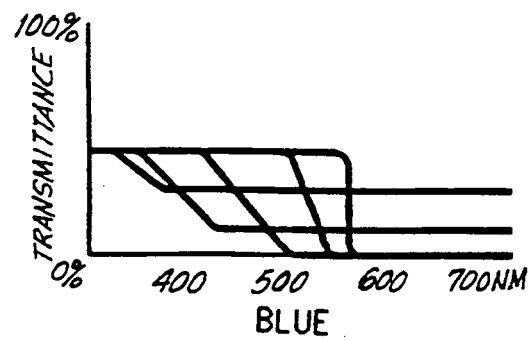
FIG. 3F

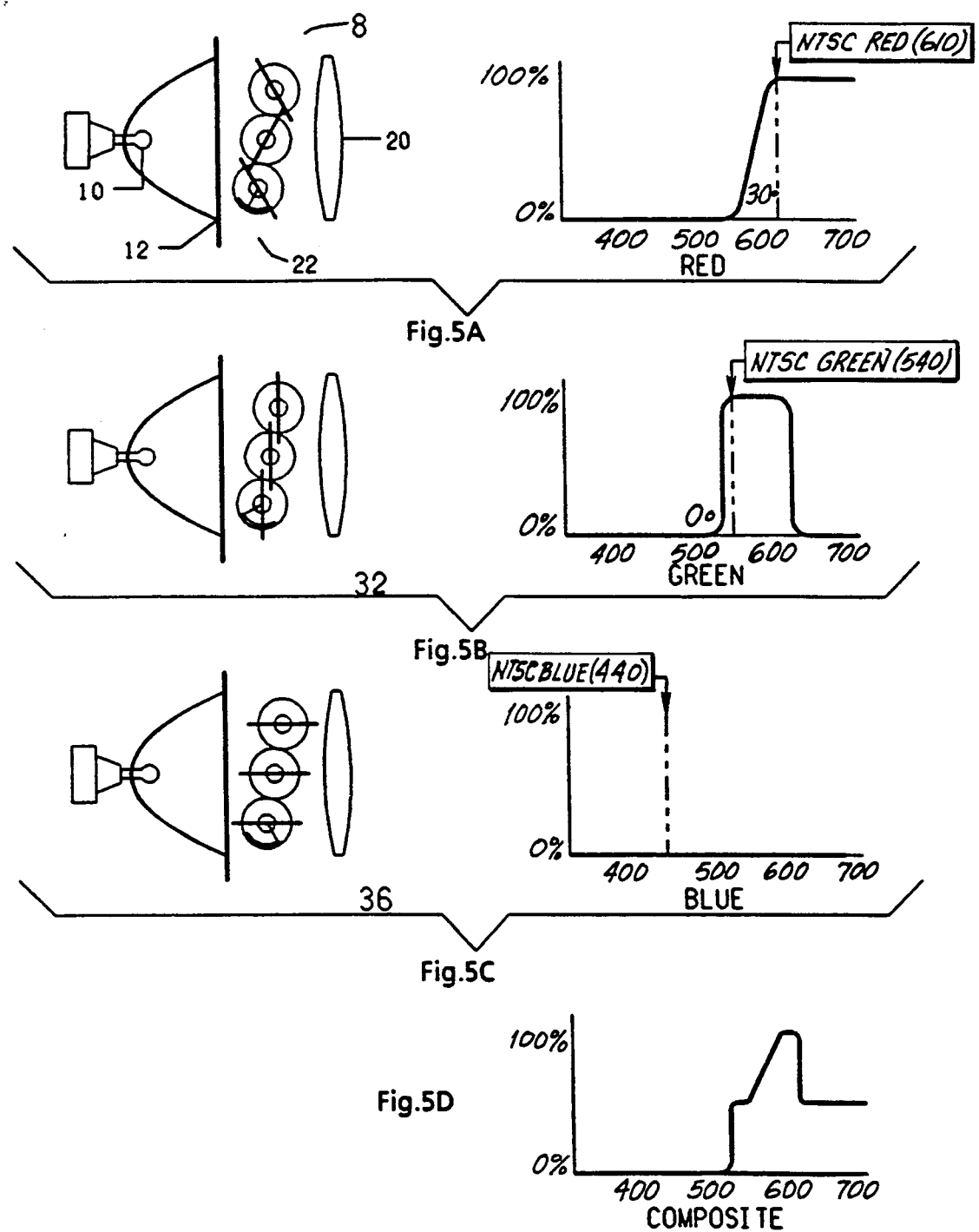

ADDITIVE COLOR MIXING SYSTEM WITH VARIABLE HUE AND SATURATION LIGHT SOURCES

BACKGROUND OF THE INVENTION

It has long been known to use a system of lighting instruments, where each are equipped with a different color filter to illuminate an area with a light having an overall desired hue and saturation. Many mechanical devices have been utilized with a limited degree of success to move color filters into and out of a light beam to vary the color of a single instrument, thereby reducing the number of instruments required. The color changer disclosed in U.S. Pat. No. 4,600,976 illustrates such a mechanism. Another example of a light source having automatically variable hue, saturation and beam divergence is disclosed in U.S. Pat. No. 4,602,321. Other examples of commercially available color changers include: a Gel Jet scrolling gel changer made by Fine Arts Technologies of Eureka, Calif.; and a Crystal Color electronic color changer made by Artifex Corporation of Costa Mesa, Calif. Lighting instruments utilizing color filters such as those noted above operate on the principle of subtracting certain wavelength light rays from a white light beam to thereby produce a resultant beam having the desired color. Generally, color producing mechanisms which have color filters arranged in series are of the subtractive type.

An alternate, well-known approach for producing a light beam of the desired color is to arrange in parallel plural colored light sources, and combine the multiple primary colored light beams in the proper proportions to obtain the overall desired color. A variable color floodlight employing such an additive coloring technique is disclosed in U.S. Pat. No. 4,535,394. The floodlight of the noted patent is configured with dichroic mirrors arranged either as a pair of crossed dichroic filters, or as a four-sided pyramid with criss-crossed dichroic mirrors in the center thereof. This arrangement is utilized to combine three primary color light beams into one composite light beam yielding the desired overall color. In U.S. Pat. Nos. 3,825,335 and 3,825,336 there is disclosed photographic apparatus employing optical fibers arranged in bundles for combining three primary colored light beams into one or two resultant composite light beams. Yet another additive color changer disclosed in U.S. Pat. No. 4,314,318 employs a multi-faceted light-reflecting member designed to combine three primary colored light beams, radially oriented 120 degrees apart, into a resultant composite light beam. These systems all employ three primary colored light beams which are produced by respective white light sources, in conjunction with suitable fixed color filters and an additive mixer.

The generation of colored light beams is generally carried out by varying the intensity of one or more primary colors and mixing the result together. While this technique is effective to achieve many variations in color, certain shortcomings arise. When two primary colors are mixed together in accordance with the noted technique, for example a red color and a green color, the common spectral wavelengths of the two primary colors predominate and yield a yellow color. However, because the centerline wavelengths of the red and green colors remain unchanged, the resultant yellow color contains vestige red and green spectral wavelengths and thus the saturation of the yellow color is diminished.

Another problem particularly prominent in additive color mixing systems is the reduced efficiency when it is desired to produce an output white light by adding the filtered light of the primary colors. The reason is that the power available from the three primary color sources is limited by the color filters used with each such light source. When the three primary colors are combined, each source is only contributing a fraction of its total energy to the resultant composite beam, the remainder being absorbed or reflected by the filter itself. This can be appreciated as the total output of the three sources, combined in the appropriate proportions, produces less power than a single, unfiltered source.

It is also difficult to obtain a high quality white light beam because color balance is very critical. Highly saturated colors are very difficult to obtain since the filtered primary color represents the most saturated hue available from the light source. The primary colors are usually utilized because they are easily used to produce many other colors.

The stage lighting instrument described in U.S. Pat. No. 4,602,321, assigned to the assignee hereof, provides independent adjustment of the hue and saturation of a light beam. The hue adjustment includes a spectrum of visible light ranging from the violet to the red, and also includes combinations of red and violet yielding shades of magenta, lavender, and pink. The continuous range of saturation adjustment includes deeply saturated hues, pastel shades, and pure white light. However, the subtractive system of the noted patent includes three sets of pivoting dichroic color filters arranged in series such that a beam of light sequentially passes through the first filter set, then passes through the second filter set, and finally passes through the third filter set. The filter properties and angle of orientation, while chosen to yield a useful range of colors, also yield certain redundant filter angles of incidence with respect to the light beam. What this means is that if the first filter set were a set of short-wave-pass blue filters rotated to a position which passes light with wavelengths in the range of 400 to 500 nanometers (nm), rotation of a second set of long-wave-pass red filters acting on light having wavelengths in the range of 600 to 700 nm, would have no effect on the resultant color of the light beam. This is because the first filter set effectively rejects or eliminates wavelengths in the 600 to 700 nm range before the light beam reached the second filter set.

In an additive color mixing system, each light source is modified separately (usually only the intensities of the light sources are modified) before the light emanating therefrom is combined. Subtractive systems, in which color filters are arranged in series, are designed and operated with the particular limitation in mind that the first filter in the series has primary control over the white light, thereby constraining the subsequent filters to operate only upon the remaining wavelengths which are allowed through the first filter. This limitation, while quite significant when considering the dichroic color balance system disclosed in U.S. Pat. No. 3,085,468, is not as great in the lighting instrument disclosed in U.S. Pat. No. 4,602,321, since any of the filter sets in the stage lighting instrument can be rotated to positions parallel to (and thus not affecting) the light beam. Still, there are certain filter combinations in which the precise position of a certain filter set may be irrelevant since the filter set has no effect on the light beam. In an additive color mixing system, each of three primary color filters acts upon a different white light beam, whereby the position of a pivoting dichroic color filter placed in the respective beam can be precisely controlled to obtain the desired resultant color.

It can be seen from the foregoing that a need exists for a high-performance additive color mixing system which overcomes the disadvantages of the devices known in the prior art. A particular need exists for a color mixing system which overcomes the limited range of hue and saturation control resulting from the use of fixed color filters. A need exists for a color mixing system which provides highly saturated colors by moving the centerline wavelengths of two primary colors together to reduce the vestige wavelenghts. Another need exists for a color mixing system which overcomes the problem of limited intensity in white light resulting from the energy wasted by the primary color filters. Yet another need exists for a color system which solves the inherent problem of the inability to produce a true white light beam.

SUMMARY OF THE INVENTION

In accordance with the present invention, an additive color mixing system is discussed which includes three light source assemblies for providing respective sources of white light. Also provided are dimmers for independently controlling the intensity of each light source. A reflector is associated with each light source for providing a collimated beam of white light. A color changing mechanism including a dichroic color filter is adapted for coloring the collimated light beam of each light source with a desired color. The dichroic filters are selected to color the collimated light beams with red, green, and blue hues. Importantly, the dichroic filters are movable in the respective light beams to adjust the center wavelengths thereof and achieve highly saturated resultant colors. The degree by which the dichroic filters are oriented with respect to the light incident thereto determines the color of the light which exits the filter. Each of the light source assemblies is independently controlled as to intensity and centerline color wavelength to thereby provide a large number of highly saturated color combinations. The three light sources are compactly housed together such that each produces a different primary color light beam, that is a red light beam, a green light beam, and a blue light beam. The three colored light beams produced by the light source assemblies are coupled along a fiber optic light path to a combiner which mixes the three light beams. The output of the combiner is directed to a projection lens which provides a composite output light beam of the system.

The color mixing system of the present invention provides good color balance in white, sufficient power in white, and the capability of obtaining deeply saturated colors in all hues.

BRIEF DESCRIPTION OF DRAWINGS

A more complete understanding of the present invention may be had by reference to the following Detailed Description when taken in conjunction with the accompanying drawings in which like reference characters generally refer to the same structure, wherein:

FIGS. 3A–3F are graphical representations of the transmittance of the red, green, and blue filter sets of the present invention relative to transmitted wavelength of the light;

FIGS. 5A–5D illustrate the respective positions of three filter sets in the three light source assemblies with associated graphs of the resulting transmittance versus wavelength for each of the three light source assemblies, and the composite output of the system adjusted to produce a saturated reddish-orange;

DETAILED DESCRIPTION OF THE INVENTION

Figure 1:
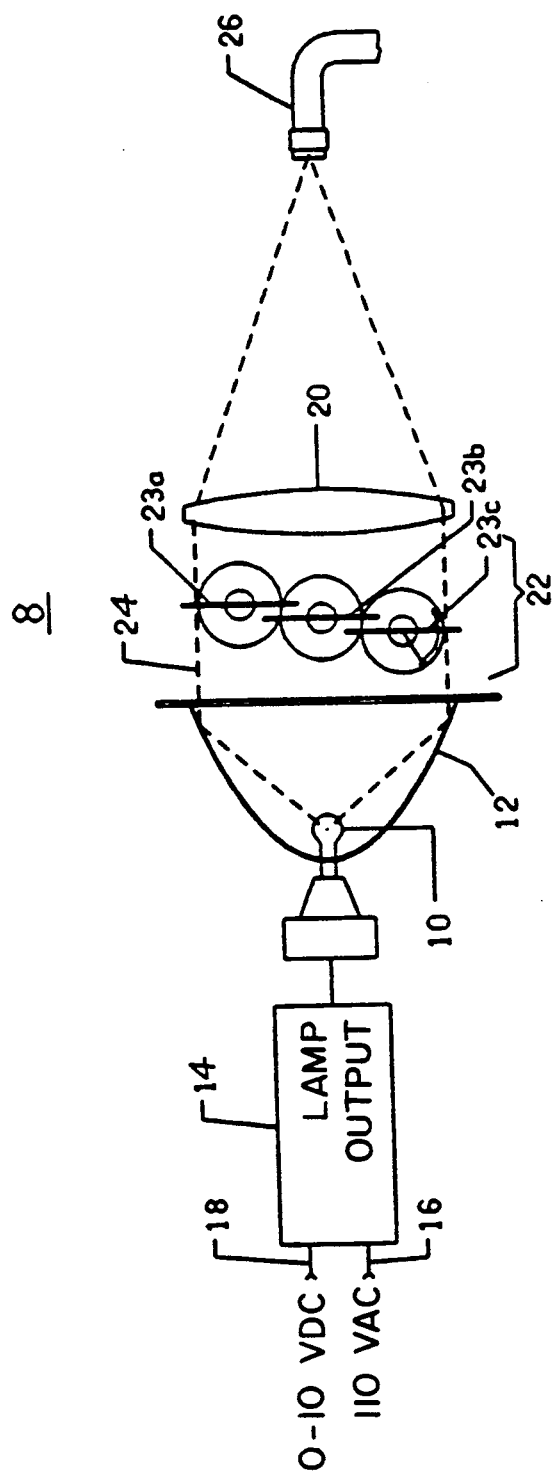
FIG. 1 is a diagram of a light source assembly of the invention.

Referring first to FIG. 1, there is shown a light source assembly constructed according to the preferred embodiment of the invention. As will be described below, three such assemblies are employed together in a single housing to provide an additive color mixing system. The light source assembly 8 includes a lamp 10 which is mounted in a reflector 12. The lamp 10 is powered by a dimmer 14 which may be a typical SCR-type variable ac power supply. AC power is applied to a power input connector 16 of dimmer 14. An analog control signal applied to a control input terminal 18 of dimmer 14 is effective to control the intensity of the light output of lamp 10. The lamp 10 and reflector 12 provide a beam 24 of white light directed at a focusing lens 20. A variable-position dichroic color filter mechanism 22 of the type described in either U.S. Pat. No. 4,392,187; or U.S. Pat. No. 4,602,321 is placed between reflector 12 and lens 20 so as to color the beam 24 of light emanating therefrom. The disclosures of the two noted patents are incorporated herein by reference.

To be described in more detail below, the ability to vary the centerline wavelength as well as the intensity of any of the primary color light beams provides the technical advantage of a whole spectrum of highly saturated colors not heretofore avaliable with conventional color changers.

The dichroic filters are shown as reference characters 23a, 23b, and 23c. Each filter 23 is individually pivoted to a specified angular orientation with respect to the incident light beam 24 by a stepper or servo motor (not shown). The angle of incidence of a light ray with respect to a planar dichroic filter is defined as the angle intercepted by the light ray and a line normal (perpendicular) to the filter at the point of incidence. As is well known, the color of a light beam passing through a dichroic filter is directly related to the angle of incidence of the light rays striking the filter. Typically the angular orientation of each such dichroic filter 23 is program controlled with a central console, or computer, so that when a specific output color is desired, the motors cause each filter to pivot to a predefined angular orientation to accurately and reliably produce such color. Dichroic filters are readily available from Optical Coating Laboratory, Inc. of Santa Rose, Calif. Focusing lens 20 converges the colored light beam 24 into a light path 26, which may be an optical fiber cable.

Although the light source assembly 8 as shown incorporates an incandescent lamp 10 a with separate reflector 12 and electronic dimmer 14, an equally suitable light source assembly 8 can be constructed using an arc lamp with an integral or separate reflector and a mechanical dimmer such as an iris or diaphragm. The light source assembly 8 shown includes a parabolic type of reflector 12 to produce substantially parallel or collimated light rays as the light beam 24 reaches the filter mechanism 22. This produces a more predictable color effect of the filters upon the light beam with respect to the angle of incidence by which light rays strike the filter. As noted above, the lens 20 is adapted to focus or converge the beam 24 upon the input of a fiber optic light path 26. A suitable light source assembly 8 can also be constructed using an elliptical reflector which itself converges the light rays upon the light path 26. However, in this case the light rays are no longer parallel and thus the angle of incidence of each of the light rays upon the filters of the mechanism 22 will vary throughout the converging beam. Nevertheless, the effect of such a compromise may be unnoticeable in many applications. Finally, although an optical fiber cable is shown as the light path 26, a system of mirrors or reflectors can also be utilized to direct multiple light beams into a combiner to produce a single, composite beam.

The light source assembly 8 of FIG. 1 is operable to produce a beam of light suitable for entertainment lighting which can be varied both as to intensity and color parameters. Intensity control to achieve color variations is accomplished by varying the analog voltage applied to input 18 of the electronic dimmer 14. Additional color control to achieve highly saturated colors is accomplished by an appropriate angular orientation of the dichroic filters 23 of the mechanism 22, as well as the dimmer 14. When three such light source assemblies 8 are combined for use in a single luminaire, an additive color mixing system can be realized which has new and unique properties.

A significant difference between variable dichroic color filter mechanisms heretofore known and the mechanism of the present invention is that in the previous mechanisms, the filter elements were effective to change a single beam of white light into desired colors by rejecting some wavelengths, whereas each color mechanism 22 provided in the present invention functions to change the white light beams into primary or other colors, and further functions to vary the hue of a selected primary color throughout a useful range of hues.

Figure 2:
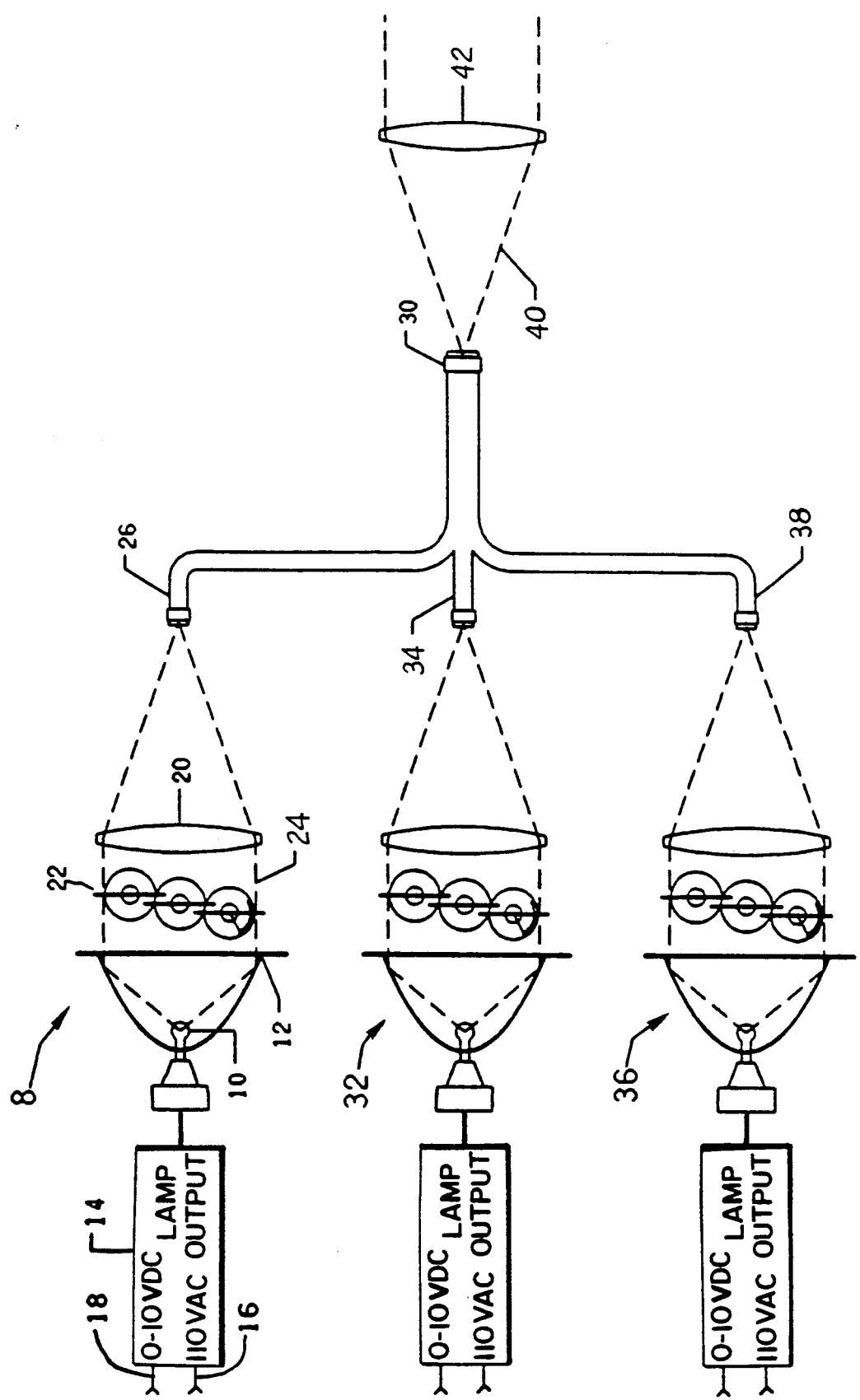
FIG. 2 is a diagram of a color mixing system employing three light source assemblies and a combining network.

Referring now to FIG. 2, the output of the light source assembly 8, which is described herein as producing red colors, is connected via the light path 26 to a combiner 30. The output of a green light source assembly 32, which is functionally identical to the red light source assembly 8, except for the color characteristics of the dichroic filter elements, is connected via light path 34 to combiner 30. The output of a blue light source assembly 36, which is also functionally identical to the red light source assembly 8, except for the color characteristics of the dichroic filter elements, is connected via light path 38 to combiner 30. The light beam 40 which emerges from the combiner 30 is sufficiently integrated by the multiple reflections which occur within the combiner 30, to produce the composite output beam 40. The output light 40 is directed to projection lens 42 for projection onto objects or areas to be illuminated with the colored light.

Suitable methods and apparatus for combining multiple beams of light into a composite beam are disclosed in U.S. Pat. Nos. 3,043,179 and 3,825,336. The noted patents describe a network of optical fiber bundles arranged with three input terminations adapted to recieve light from three primary color sources, and further arranged with a single ouput termination adapted to project a composite image or light beam. In the output termination of U.S. Pat. No. 3,043,179 the optical fibers are arranged to faithfully reproduce an image provided at the inputs thereof. In the output termination of U.S. Pat. No. 3,825,336 the optical fibers are arranged to diffuse a concentration of light rays in the center of a beam applied to the input terminations. The disclosures of the noted patents are incorporated herein by reference.

The apparatus disclosed in U.S. Pat. No. 4,535,394 utilizes dichroic filters to steer different colored light beams from three different sources into a common output path. Wavelength dependent reflecting and transmitting means such as dichroic filters impose limitations on the range of hue variation permissible when used as the beam combining means in the present invention. The apparatus disclosed in U.S. Pat. No. 4,314,318 utilizes a multifaceted mirror to combine three light beams from three geometrically arranged sources into a common output path. Geometrically complex reflecting means such as this are inefficient combiners of multiple light beams since diverging light rays which miss their assigned facets and strike adjacent facets are reflected into other regions of the luminaire housing and are not reflected along the common output path.

From the foregoing, disclosed is an additive color mixing system of the invention, in which white light has substantially the same power of the three sources added together. When the filters 23 are pivoted so they are parallel to the beam, they filter out no energy and thus the combined, white, balanced spectrum generated by the lamps is available.

White light can be dimmed without drastically altering the color balance by dimming only one of the three sources, or by turning one source off. The remaining sources remain properly color-balanced. Incandescent tungsten lamps have an inherent characteristic, in that the color balance of light emanating from a lamp changes as the power dissipated in the lamp changes. When the power level is decreased to lower the output intensity of a lighting instrument, the color balance is changed. In the apparatus of the present invention, any of the three sources 8, 32, or 36 can be dimmed independently of the other two, so that two light sources still produce properly balanced light white, while the overall intensity of the beam 40 is reduced according to the reduction of intensity of the light of the third source. The effect is less drastic than would be the case if a single lamp were dimmed and the source of all light were changed in color balance.

The hue and saturation of each of the three additive sources 8, 32, and 36 is adjustable as well as the intensity of the source, thereby providing a much broader range of colors, including when desired, very saturated colors. These colors will be generally brighter and contain more energy than the colors available from prior art devices.

Referring now to FIGS. 3A–3C, there is graphically depicted the spectral outputs of the three primary color light source assemblies 8, 32, and 36 of the present invention for various angles of incidence of the respective light beams upon the respective filters.

FIG. 3A is a graph illustrating the effect of the angle of incidence of the filter set 22 upon the color transmitted from the red light source assembly 8. Specifically, curve 50 depicts the transmittance versus wavelength when the angle of incidence of the red dichroic filter set 22 with respect to the light beam is zero, i.e., filters perpendicular to the light rays. Curve 52 illustrates the transmittance versus wavelength when each filter of filter set 22 have an angle of incidence of thirty (30) degrees. Curve 60 illustrates the transmittance versus wavelength when the filters 22 have an angle of incidence of eighty (80) degrees. It should be noted that for angles of incidence greater than about forty-five (45) degrees, unfiltered white light passes between the individual filters 23a, 23b, and 23c of the filter set 22. At angles of incidence less than about 45 degrees, the overlapping filters 23 of the set 22 intercept all light rays such that no unfiltered light passes through the filter set 22. Curves 50, 52, and 54; illustrating transmittance versus wavelength for respective angles of incidence of zero degrees, 30 degrees, and 45 degrees; intersect the horizontal axis at various points representing zero transmittance in short-wavelength regions of the spectrum. Curves 56, 58, and 60; illustrating transmittance versus wavelength for respective angles of incidence of 53 degrees, 75 degrees, and 80 degrees; do not intersect the horizontal axis. Curve 56 illustrates a phenomenon which may be described as a "white light floor," which defines the horizontal portion of the curve representing about 12% transmittance in the 300 nm to 400 nm range. This "floor" rises to about 37% transmittance in the 300 nm to 350 nm region when the angle of incidence increases to 75 degrees, as shown by curve 58.

FIG. 3B is a graph of transmittance versus wavelength for various angles of incidence of the green filter set of light source assembly 32. It may be seen that as the angle of incidence of the light rays upon such filter set changes from zero degrees to 75 degrees, the color transmitted by the filter set changes from a yellow-green, to a deep green, and as white light is added the change is toward a pastel green-blue.

FIG. 3C is a graph of transmittance versus wavelength for various angles of incidence of light rays upon the blue filter set of light source assembly 36. It may be seen that as the angle of incidence changes from zero degrees to 75 degrees, the color transmitted by the filter set changes from a light blue-green to a deep violet, and as white light is added the change is toward a pastel lavender.

FIGS. 3D, 3E, and 3F illustrate respectively transmittance versus wavelength for the red, green, and blue filter sets, but at 50% intensity as controlled by the associated dimmers. FIG. 3D shows the same curves as in FIG. 3A, except the intensity of the light output by the lamp 10 is reduced by the dimmer 14 to 50%. However, the same angles of incidence are represented in both figures. Likewise, FIGS. 3B and 3E show the same curves for the same angles of incidence, again at different levels of light intensity. The same is true for FIGS. 3C and 3F. Those skilled in the art can readily select dichroic filter constructions which can give the light spectral outputs noted in the figures.

FIGS. 4–6 illustrate the operation of the present invention showing three light source assemblies 8, 32, and 36 (red, green, blue) with corresponding transmittance versus wavelength graphs for each assembly, and a composite transmittance versus wavelength graph showing the spectral composition of the composite output beam.

Figure 4A:
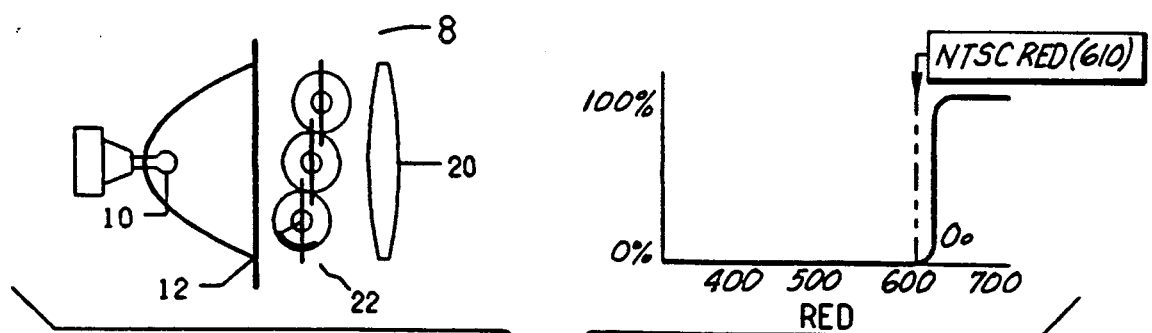
FIGS. 4A–4D illustrate the respective positions of three filter sets in the three light source assemblies with associated graphs of the resulting transmittance versus wavelength for each of the three light source assemblies, and the composite output of the system operating as an additive color changer.

In FIG. 4A, the red light source assembly 8 has its filter set 22 rotated to a position of zero degrees angle of incidence (filters are perpendicular to the light rays). The red filter set then passes light rays in the 625 to 780 nm range (deep red).

Figure 4B:
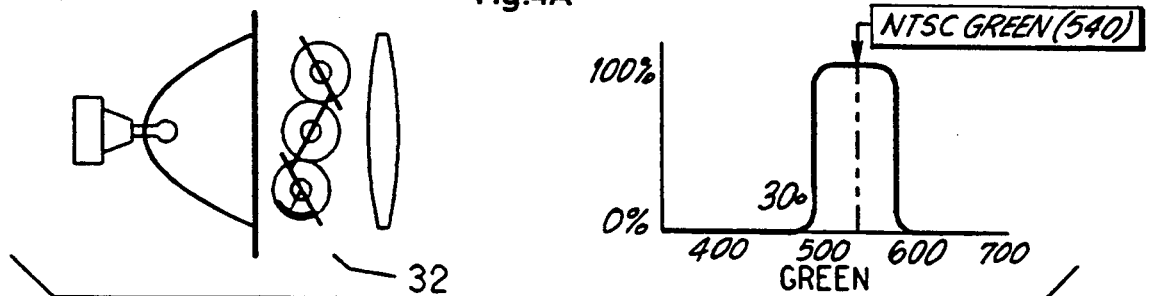

In FIG. 4B, the green light source assembly 32 has its filter set rotated to a position of 30 degrees angle of incidence. The green filter set then passes light rays in the 475 to 575 nm range (medium green).

Figure 4C:
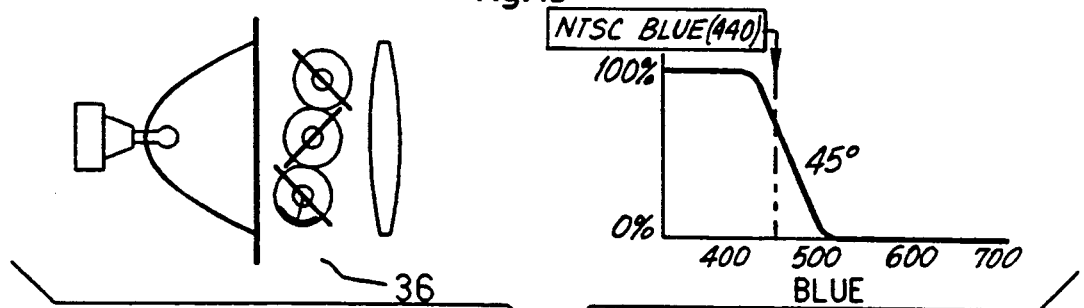

In FIG. 4C, the blue light source assembly 36 has its filter set rotated to a position of 45 degrees angle of incidence. The blue filter set than passes light rays in the 380 to 425 nm range (deep blue).

Figure 4D:
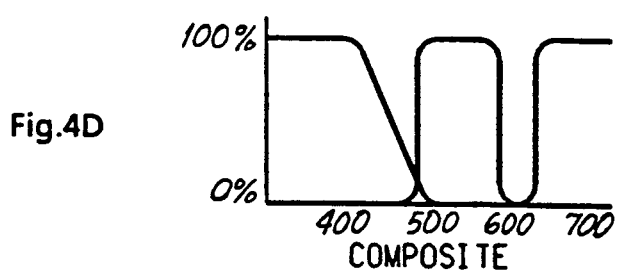

The composite output light beam shown in FIG. 4D includes the red, green, and blue portions of the spectrum generated by each light source assembly 8, 32, and 36. By varying the intensity of any one or all of three primary-color light sources, many different hues can be obtained. It is to be noted that the National Television Standards Committee (NTSC) primary wavelengths, which represent the centers of three bands of wavelengths, are shown for purposes of reference. In this case, the green light source assembly 32 passes light rays in a band centered about the NTSC green primary color center (540 nm). The red light source assembly 8 passes light rays in a band which is further into the red range than the wavelength of the NTSC red primary color center. The blue light source assembly 36 passes light rays in a band which is further into the blue range than the NTSC blue primary color center.

To obtain yellow or orange colors, the blue light source assembly 36 is dimmed to zero intensity, while the intensities of red and green light source assemblies 8 and 32 are varied to obtain the desired color. It can be seen from the composite spectral output graph of FIG. 4D that certain light rays in the 575 to 625 nm band are not produced, as such color wavelengths are filtered-out by the red and green filter sets. To obtain a more deeply saturated orange or yellow, the pass-band of the red light source assembly 8 can be shifted into the yellow range by rotating the red filter set 22 to a greater angle of incidence while the pass-band of the green light source assembly 32 can be shifted into the yellow range by rotating the green filter set to a lesser angle of incidence.

FIGS. 5A–5C illustrate a technique for obtaining more deeply saturated yellow and orange colors in the manner described above. The red filter set 22 is rotated to obtain a 30 degree angle of incidence, thereby shifting the spectral output of red light source assembly 8 into the 575 to 780 nm range. The green filter set of assembly 32 is rotated to obtain a zero degree angle of incidence, thereby shifting the spectral output of green light source assembly 32 into the 525 to 625 nm range. The red and green light source assemblies 8 and 32 are dimmed to 50% intensity while the blue light source assembly 36 is dimmed to zero intensity. The composite spectral output depicted by the graph of FIG. 5D shows a 50% light intensity in the 525 to 780 nm range, except in the range in which the spectral output curves of the red and green light source assemblies 8 and 32 overlap. In this range (550 to 625 nm) a transmittance peak rising to about 100% relative intensity is formed, yielding a deeply saturated reddish-orange color. The composite output beam thus contains the greatest energy in the range of 600 to 625 nm, whereas the case illustrated in FIG. 4A produced no energy in this range.

The blue filter set is shown in FIG. 5C rotated to obtain 90 degrees angle of incidence such that the blue color filters are essentially removed from the light path of blue light source assembly 36. As the intensity of the light emitted from the light source assembly 36 is increased, the saturation of the reddish-orange color is reduced by the introduction of broad-band white light.

It can be seen by the shape of the red and green spectral output curves that the position of the red filter set controls the location of the spectral peak. As the red filter set is rotated to greater angles of incidence, this peak moves further into the yellow range, yielding saturated orange, yellowish-orange, and yellow hues.

Figure 6A:
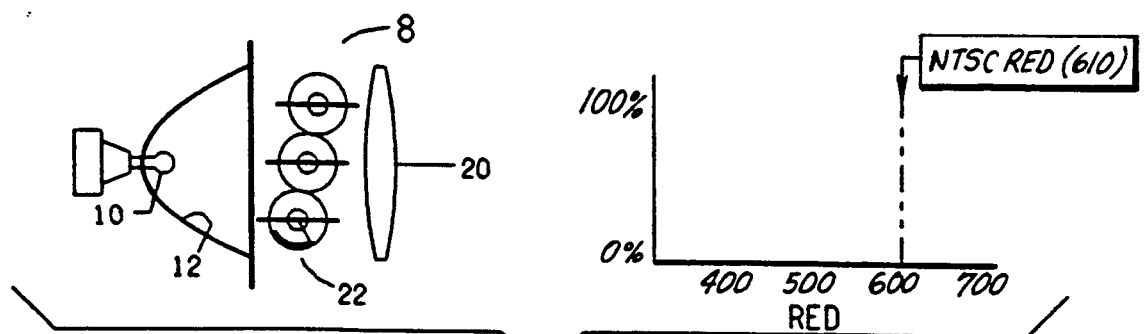
FIGS. 6A–6D illustrate the respective positions of three filter sets in the three light source assemblies with associated graphs of the resulting transmittance versus wavelength for each of the three light source assemblies, and the composite output of the system adjusted to produce a saturated bluish-green.
Figure 6B:
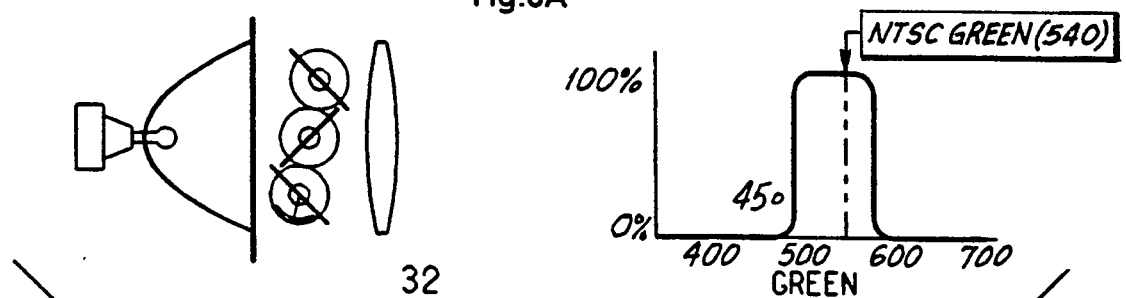
Figure 6C:
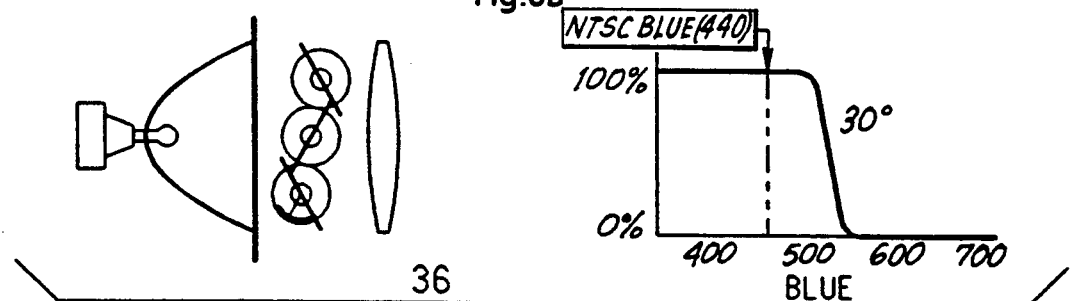
Figure 6D:
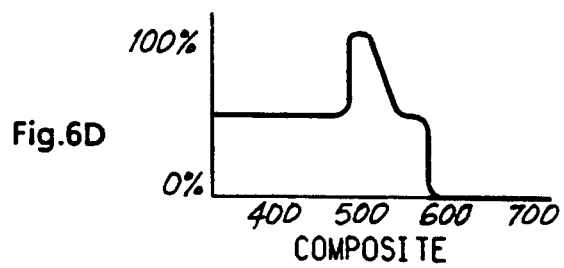

FIGS. 6A-6D illustrate the technique for obtaining deeply saturated greens and blues. The green filter set of assembly 32 is set to 45 degrees, shifting the spectral output of the green light source assembly 32 more into the blue range. The blue filter set of assembly 36 is set to 30 degrees, thereby shifting the spectral output of blue light source assembly 36 more into the green range. The red filter set 22 is set to 90 degrees, effectively removing the filters from the light path of the red light source assembly 8. Hence, the output of the red light source assembly is essentially white light. The spectral peak shown in the composite output graph of FIG. 6D is located around 495 nm, a bluish-green color. Again, the relative intensities of the green and blue light source assemblies 32 and 36 are dimmed to 50% while the intensity of light source assembly 8 is dimmed to zero. The location of the peak is controlled by the angle of incidence of the blue filter set of assembly 36. As the intensity of light source assembly 8 is increased, the purity of the composite output beam 40 is diluted by white light from light source assembly 8, thereby decreasing the saturation of the bluish-green color.

It can be seen from the foregoing that a new and useful color changing apparatus can be constructed utilizing pivoting dichroic color filters to produce three primary-color light beams, the spectral content of which can be varied along with the relative intensities of the three beams to obtain a wide variety of resultant colors. The color system of the invention can also produce deeply saturated colors in the regions between the spectral primaries, in a way not possible using primary-color light sources of fixed spectral output. By shifting the pass-bands of the additive primaries, spectral peaks can be obtained in regions located between the conventional additive primaries, thereby yielding more deeply saturated colors than can be obtained using conventional additive color changers.

It is also possible to construct a luminaire having two variable-color light source assemblies of the present invention with a green filter set in one light source assembly and a magenta filter set in another light source assembly. Since green light combined with magenta light produces a white light, many different colors of light can be obtained by varying the relative intensities of the green and magenta components of a combined beam to achieve a desired color of the resultant beam of light. When the capability of shifting the hue and varying the saturation of the additive components is included in the performance of a two-source luminaire, the performance of such a luminaire is greatly increased with the benefits described. The filters may be pivoted parallel to the light beam when white light is desired, such that no energy is filtered out, whereupon a combined, white, balanced spectrum is available. The hue and saturation of the two sources should preferably be adjustable, as well as the intensity of the two sources, providing a larger range of colors including deeply saturated colors when desired.

Although the foregoing embodiment utilizes a plurality of basic light sources (lamps), it is also possible to use one powerful light source with beam splitting devices, such as prisms or mirrors, to generate individual beams for use with multiple filter sets. In such a case, mechanical dimming means can be utilized to obtain the individual intensity control normally required in an additive color mixing system, since an electronic dimmer of a single light source would dim each of the resultant multiple light beams equally.

Figure 7:
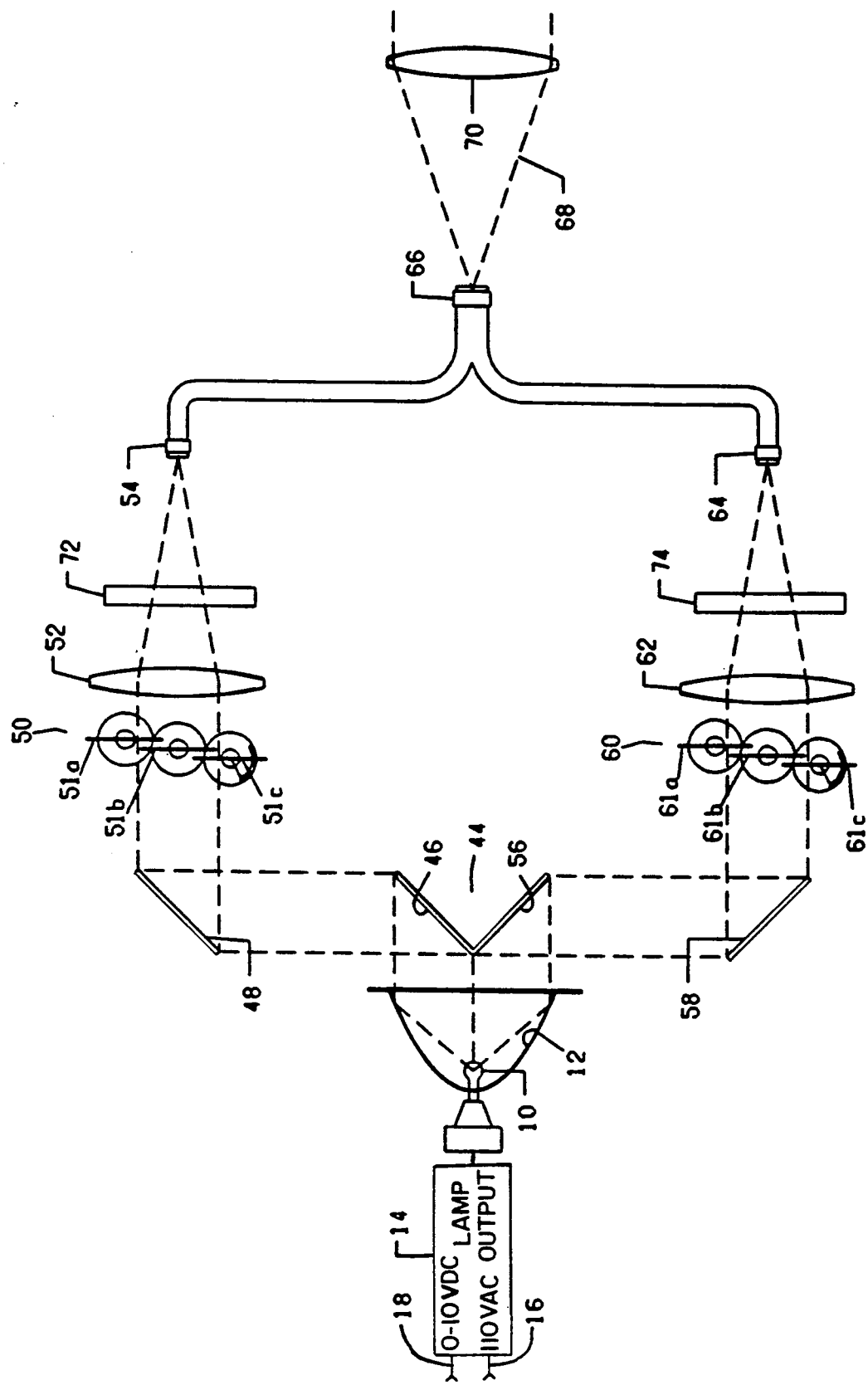
FIG. 7 is a diagram of a color mixing system employing one light source with a beam divider, two filter sets, and a combining network.

Referring now to FIG. 7, a single lamp 10 is shown mounted in the reflector 12 to produce a light beam which is divided into plural light beams, each acted upon by a different color changer. The lamp 10 is powered by dimmer 14 having power input terminal 16 and control input terminal 18. The lamp 10 and reflector 12 provide a beam of white light directed at a beam splitting mirror 44.

The splitting mirror 44 is composed of two reflecting surfaces 46 and 56 which are each disposed in the beam path at 45 degree angles with respect to the beam and at a 90 degree angle with respect to each other.

Reflecting surface 46 directs substantially half of the light beam towards a redirecting mirror 48. Light rays are directed from lamp 10 and reflector 12 to reflecting surface 46, to redirecting mirror 48, through a green filter set 50, through a converging lens 52, through a dimming iris 72, and onto a light path input 54. Filters 51 of filter set 50 are preferably complex color dichroic filters which pass green light and reflect red and blue light. Dimming iris 72 is of conventional design to control the intensity of the green light transmitted by filter set 50. When filters 51 are rotated to zero degrees angle of incidence, as shown, the dimming iris 72 is used to control the intensity of white light passing through filter set 50.

Reflecting surface 56 of the splitting mirror 44 directs substantially half of the light beam towards a redirecting mirror 58. Light rays are directed from lamp 10 and reflector 12 to reflecting surface 56, to redirecting mirror 58, through a magenta filter set 60, through a converging lens 62, through a dimming iris 74, and onto a light path input 64. Filters 61 of filter set 60 are preferably complex color dichroic filters which pass red and blue (magenta) light and reflect green light. Dimming iris 74 is use to control the intensity of the red and blue (magenta) light transmitted by filter set 60. When filters 61 are rotated to zero degrees angle of incidence, as shown, dimming iris 74 is used to control the intensity of white light passing through filter set 60.

A composite light beam 68 is projected from the light path output termination 66 towards projection lens 70. The hue of the composite beam is controlled in part by the relative intensities of green and magenta components of the beam as controlled by dimming irises 72 and 74. The hue of the composite beam is also controlled by the hue transmitted by the green and magenta filter banks 50 and 60. The intensity of the composite beam can be controlled by the control input 18 to dimmer 14, or by coordinated actuation of dimming irises 72 and 74.

While the preferred and other embodiments of the invention have been disclosed with reference to specific color mixing apparatus, it is to be understood that many changes may be made as a matter of engineering choice without departing from the spirit and scope of the invention, as defined by the following claims.

What is claimed is:

1. An additive color mixing system for a light projector, comprising:
    at least two light source assemblies, each including;
        a light for generating light rays defining a beam of light,
        an intensity control for varying the intensity of said beam of light,
        color changing apparatus for varying a hue and saturation of said beam of light, including at least one dichroic filter movably positioned in said beam of light and operable to move from a first position to a second position and thereby change a centerline wavelength of light transmitted therethrough to produce a desired colored light; and
    a combiner for receiving colored light generated by said light source assemblies and for combining the beams of colored light into a composite beam.

2. The additive color mixing system of claim 1, wherein said dichroic filters are movable by said color changer to intermediate positions between said first position substantially parallel to said light rays to said second position substantially perpendicular to said light rays.

3. The additive color mixing system of claim 1, further including a bundle of optical fibers for coupling the colored light from each said color changer to said combiner.

4. The additive color mixing system of claim 1, further including a mirror arrangement for coupling the colored light from said each color changer to said combiner.

5. The additive color mixing system of claim 1, wherein said combiner comprises an arrangement of interwoven optical fibers.

6. The additive color mixing system of claim 1, wherein said combiner comprises an arrangement of mirrors and dichroic filters.

7. The additive color mixing system of claim 1, wherein each said intensity control is adapted for independently varying the intensity of the light emitted by each said light source assembly.

8. The additive color mixing system of claim 1, wherein said dichroic filters are pivotally movable to desired angular orientations with respect to respective said light rays.

9. The additive color mixing system of claim 1, wherein each color changer includes multiple dichroic filters which are mechanically interconnected to provide for rotation to substantially the same angles of incidence.

10. The additive color mixing system of claim 9, wherein said dichroic filters are pivotal to positions so that light from a respective said beam can pass therearound and change the saturation of the color produced by the respective said color changer.

11. The additive color mixing system of claim 1, wherein each said intensity control comprises a mechanical control disposed in the path of the respective light beam for restricting the amount of light transmitted therethrough.

12. An additive color mixing system for a light projector, comprising:
    a light source assembly comprising;
    a light for generating rays defining a beam of light,
        means for dividing said beam into at least two beams of light;
    at least two color filters mechanisms, each adapted to accept one said light beam, each color filter mechanism including
        means for varying the hue and saturation of one said beam of light, including at least one dichroic filter rotatably movable in a path of the divided beam of light and operable to rotate from a first position substantially parallel to the light rays to a second position substantially perpendicular to the light rays to produce colored light;
        means for carrying said colored beams of light along respective paths;
    an intensity control for varying the intensity of said divided beams of light; and
    a combiner for combining the two colored beams of light from the respective paths into a composite beam.

13. The additive color mixing system of claim 12 wherein a plurality of said dichroic filters are movable by said color changer to intermediate positions between said first and second positions.

14. The additive color mixing system 12, further including a bundle of optical fibers for coupling the colored light from said color filter mechanisms to said combiner.

15. The additive color mixing system of claim 12, further including a mirror arrangement for coupling the colored light from said color filter mechanism to said combiner.

16. The additive color mixing system of claim 12, wherein said combiner comprises an arrangement of interwoven optical fibers.

17. The additive color mixing system of claim 12, wherein said combiner comprises an arrangement of mirrors and dichroic filters.

18. The additive color mixing system of claim 12, wherein said intensity control is adapted for independently varying the intensity of the divided light beams.

19. The additive color mixing system of claim 12, wherein said dichroic filter is pivotally movable to desired angular orientations with respect to said light rays.

20. The additive color mixing system of claim 12, wherein each color filter mechanism includes multiple dichroic filters which are mechanically interconnected to provide for rotation to the same angles of incidence.

21. An additive color mixing system for a light projector, comprising:
    a plurality of light sources each for generating a beam of light,
    a color changer associated with each said light source for coloring the respective light beam with desired hues, at least one said color changer being adapted for selecting a centerline wavelength hue of an associated light beam from a continuum of centerline wavelength hues so that the selected centerline wavelength and centerline wavelength hues with respect to other colored light beams can be brought together to provide a desired enhanced saturated hue from a range of saturated hues, an intensity control for varying the intensity of the light beams produced by said light sources; and a light mixer for mixing the colored light produced by each said color changer to provide a composite colored light beam.

22. The additive color mixing system of claim 21, further including a dichroic color changer having a dichroic filter which is movable with respect to the associated light beam to vary the centerline wavelength thereof.

23. The additive color mixing system of claim 21, further including means for varying the intensity of each light beam to vary the saturation of the color produced by the respective color changer, and for varying the position of a dichroic filter to change the hue of the color produced by the respective color changer beams.

24. The additive color mixing system of claim 22, wherein said color changer includes means for pivoting the dichroic filter to change the angle of incidence with respect to the light rays striking the dichroic filter.

25. A method for generating and mixing colored light, comprising the steps of:
producing a plurality of light beams;
changing the intensity of at least one of the light beams to produce a change in the saturation of a respective resultant colored light beam;
changing the hue of the light beams to alter respective centerline wavelengths thereof by pivoting dichroic filters to alter the incidence angle by which light beams strike the respective filters; and
mixing the colored light beams together to provide a composite light beam having the combined color characteristics of the individual colored light beams.

26. The method of claim 25, further including moving a centerline wavelength characteristic of at least two colored light beams closer together to provide a highly saturated hue of the composite light beam.

* * * * *